United States Patent [19]

Hubbard et al.

[11] Patent Number: 4,611,737

[45] Date of Patent: Sep. 16, 1986

[54] TRACTOR APPARATUS

[75] Inventors: John D. Hubbard; Leo J. Kerivan, both of Somerset, Mass.

[73] Assignee: Precision Handling Devices Inc., Fall River, Mass.

[21] Appl. No.: 721,100

[22] Filed: Apr. 8, 1985

[51] Int. Cl.[4] .................................... G03B 1/30

[52] U.S. Cl. .................................... 226/74; 400/616.2

[58] Field of Search .................... 226/74, 75, 87; 400/616.1, 616.2; 271/275

[56] References Cited

U.S. PATENT DOCUMENTS

| | | | |
|---|---|---|---|
| 3,825,162 | 7/1974 | Hubbard | 226/74 |
| 4,129,239 | 12/1978 | Hubbard | 226/75 |
| 4,130,230 | 12/1978 | Seitz | 226/75 |
| 4,226,353 | 10/1980 | Blaskovic et al. | 226/74 |
| 4,469,263 | 9/1984 | Seitz | 226/74 |
| 4,471,896 | 9/1984 | Milano, Jr. | 226/74 |

*Primary Examiner*—Leonard D. Christian
*Attorney, Agent, or Firm*—Martin LuKacher

[57] ABSTRACT

A tractor for feeding perforated webs, such as perforated paper in a computer printer, typewriter or the like has a frame which locates a sprocket and a belt having pins projecting from the belt and lugs driven by the sprocket. To provide precision feeding of the web the lid is arranged with respect to the frame so that the web is maintained substantially at the pitch line of the belt where the pins enter, are engaged by and leave the perforations. The distance between the surface of the lid which faces the belt and the belt surface is limited such that the perforations contact the pin surface below a critical position where the web clings to the pins. This is the position where the angle between the surface of the belt and a line from the position of repose perpendicular to a tangent to pin surface which intersects the belt surface is equal to the art tangent of the coefficient of friction between the web and pin materials. The lid surface is preferably provided by a rib extending the length of the lid to overlie and extend beyond the region of entry and engagement of the pins and web perforations. This rib provides a thrust surface against which the pins bear to accommodate the side thrust toward the center of the web when the web is driven by two tractors engaging rows of perforations along the opposite edges of the web.

25 Claims, 10 Drawing Figures

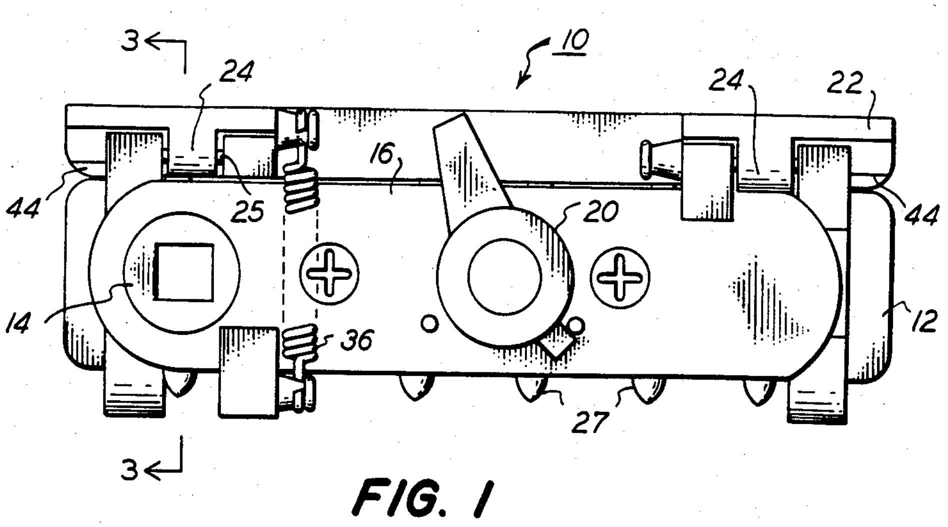
FIG. 1
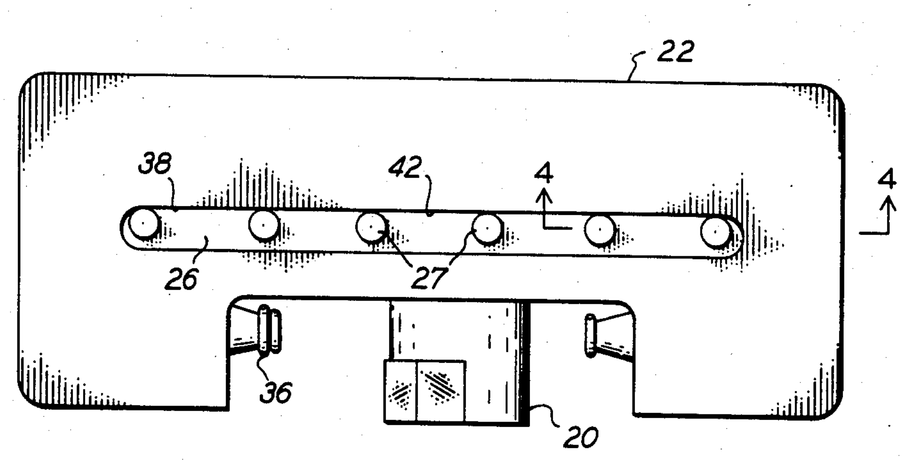
FIG. 2
FIG. 3
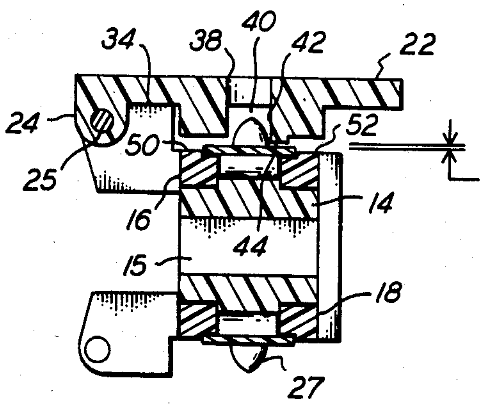

TRACTOR APPARATUS

DESCRIPTION

The present invention relates to tractor apparatus of the type which is useful in feeding perforated webs and particularly edge perforated paper.

The present invention is especially suitable for use in tractors which feed perforated webs at high speed and with high accelerations, usually in steps, as in computer printers so as to present successive lines or portions of lines for printing of characters or graphical displays. Features of the invention may also be useful wherever feeding is accomplished by entry of one element into another so as to provide driving engagement therebetween.

The conventional paper feed tractor has a sprocket driven belt. The belt is entrained about one or more sprockets. The driving of the perforated paper is provided for by pins (sometimes called drive elements) which enter into the perforations in the paper. Usually two tractors are used which engage perforations along opposite edges of the belt. The paper is tensioned widthwise between the tractors. The pins have a cylindrical base and a curved apex extending from the base. The diameter of the cylindrical base is approximately equal to the diameter of the perforations so as to apply the driving stresses about a maximum area of the perforations and present a large vertical area of the pin surface where the pin may contact the perforations. The area of contact is set by a lid having a slot into which the pins project. The surface of the lid facing the belt is spaced from the belt by a distance equal to the height of the cylindrical portion of the pins. The lid and the frame which defines the path of the paper through the tractor are separated by a lid gap which allows the paper to move and position itself around the cylindrical portion of the pin so as to make driving contact. The pitch of the perforations (the distance between the centers of the perforations), and the pitch of the pins (the distance between the centers of the pins along the pitch line of the belt) is identical. Accordingly, if the paper feed speed is slow and the accelerations relatively low, the paper will have sufficient time to locate itself on the cylindrical bases of the pins and maintain sufficient accuracy and precision in the feeding of the paper. At high feeding speeds and accelerations as are now required in high speed printers, the acceleration and velocity of the feed in order to accommodate line feed commands (each command requiring the stepper motor which drives the tractor to execute a high acceleration and move the paper almost instantaneously between successive lines) occur too rapidly to enable the paper to locate itself around the cylindrical base of the pins. The problem is exacerbated when the tractors are used to feed the paper along a vertical path, since gravity is not present to assist the paper to locate itself. Entrained air between the paper and the belt is believed also to be a cause, preventing the location of the paper around the cylindrical portions of the pins during high speed, high acceleration feeding operations.

Another problem which is more evident during high than low speed feeding operations is the "ticking" of the paper on entry and departure of the pins from the perforations (also known as stripping). The area of the cylindrical base which is intersected by the paper during entry and departure, since the paper is maintained in a linear path between the frame and the lid, is an ellipse, rather than a cylinder. The major axis of the ellipse has a larger diameter than the diameter of the perforations. Thus, during high speed feeding, where the web does not have sufficient time to locate itself on the cylindrical portion during stripping, the front and rear of the perforations may be stretched, deformed and even torn during feeding.

Another problem in precision feeding is caused by the thrust on the pins toward the center of the paper when the paper is fed by two tractors which engage perforations along opposite edges of the paper. This thrust creates a couple tending to pivot the pins about the pitch line and can distort or tear the perforations on which accuracy of feeding depends.

Elimination of the cylindrical base portion of the pin has been found, in accordance with the invention, not to be a sufficient solution to the problems which adversely affect accurate and precision feeding of perforated webs, which problems are described above. While the use of a curved, substantially involute shape of the pins can prevent ticking, such shapes increase the drag which the tractor places on the paper and can even cause jams of the paper within the tractor. It has been discovered in accordance with the invention that the position on the pin surface where the perforation contacts the pin is critical in order to prevent excessive drag and jams in the tractor, when feeding webs at high accelerations and speeds. Unless the position of contact is closer than the critical distance from the surface of the belt, the slope of the pin will cause the paper to slide up and lock between the lid and the pin. The critical distance is related to the angle of repose of the paper on the pin. The angle of repose may be measured between a line perpendicular to a tangent to the surface of the pin at the position of repose and the surface of the belt at the base of the pin. This angle of repose is equal to the arc tangent of the coefficient of friction of the pin and paper materials. The critical distance to the position of repose above the surface of the belt (essentially the pitch line of the belt) is approximately equal to the radius of the pin at the belt surface or pitch line times the sine of the angle of repose.

In order to maintain the paper below the critical distance the lid surface which defines the lid gap is placed sufficiently close to the pitch line of the belt so that the paper is held at or near the pitch line. In order to provide for pressure relief to allow large thicknesses of paper, crimps and tents at cross perforations in the web, the lid is preferably yieldably biased. Accordingly, pins which are curved along their entire surfaces, for example in essentially involute shapes, so as to prevent ticking, may be used in tractor apparatus which provide high speed high acceleration feeding without excessive drag or jam-ups of the paper in the tractor.

To prevent couples which may twist the belt due to the forces on the sides of the pin facing the inside of the paper, these sides may be truncated and flattened over a sector about a pin radius perpendicular to the paper feed path of from about 60° to 90°, the driving surface presented by the pin is then reduced less than about 10%. The lid is provided with a rib having a wall extending along the path of movement of the web which defines a surface against which the flattened portion of the pins may bear. The thrust may also be counteracted by extending the wall substantially to the surface of the belt and contacting the pin at or near its base. The rib also serves to provide a surface facing the belt which defines a lid gap below the critical gap defined by the angle of repose.

Accordingly, it is the principal object of the present invention to provide improved tractor apparatus which is effective in feeding webs at high speed and at high acceleration with high precision and accuracy.

It is a further object of the present invention to provide improved tractor apparatus in which ticking of perforations is eliminated without imposing increased drag or jam-ups of the perforated paper in the tractor.

It is a still further object of the present invention to provide improved tractor apparatus wherein problems associated with high speed high acceleration feeding of perforated webs can be accommodated in a simple, effective and low cost manner.

It is a still further object of the present invention to provide improved tractor apparatus which counteracts the effect of side thrusts on the web accompanying feeding with tractor pairs in engagement with opposite edge perforations.

Briefly described, a tractor for feeding a perforated web which embodies the invention utilizes a web drive member having a pitch line. The web drive member has pins extending above the pitch line and spaced from each other a distance equal to the pitch of the perforations in the web so as to enter and engage the web in the perforations. A frame is provided in which the web drive member is movably mounted with its pitch line along a given path in a region of the member where the pins enter and are engaged with the perforations. A lid is provided which is movable toward and away from the frame. The lid has a surface disposed opposite to the region of the member where the pins enter and are engaged in the perforations. The lid is provided with means for maintaining the surface thereof which is opposite to that region of the member spaced sufficiently close to the pitch line to locate the web substantially at the pitch line. The lid gap is maintained below the critical distance defined by the angle of repose. Excessive drag and jam-ups are therefore avoided in the tractor.

The foregoing and other objects, features and advantages of the invention as well as presently preferred embodiments thereof will become more apparent from a reading of the following description in connection with the accompanying drawings in which:

FIG. 1 is a side view of a tractor embodying the invention;

FIG. 2 is a top view of the tractor shown in FIG. 1;

FIG. 3 is a sectional view of the tractor through the sprocket thereof, the view being taken along the line 3—3 and FIG. 1;

Figure 4:
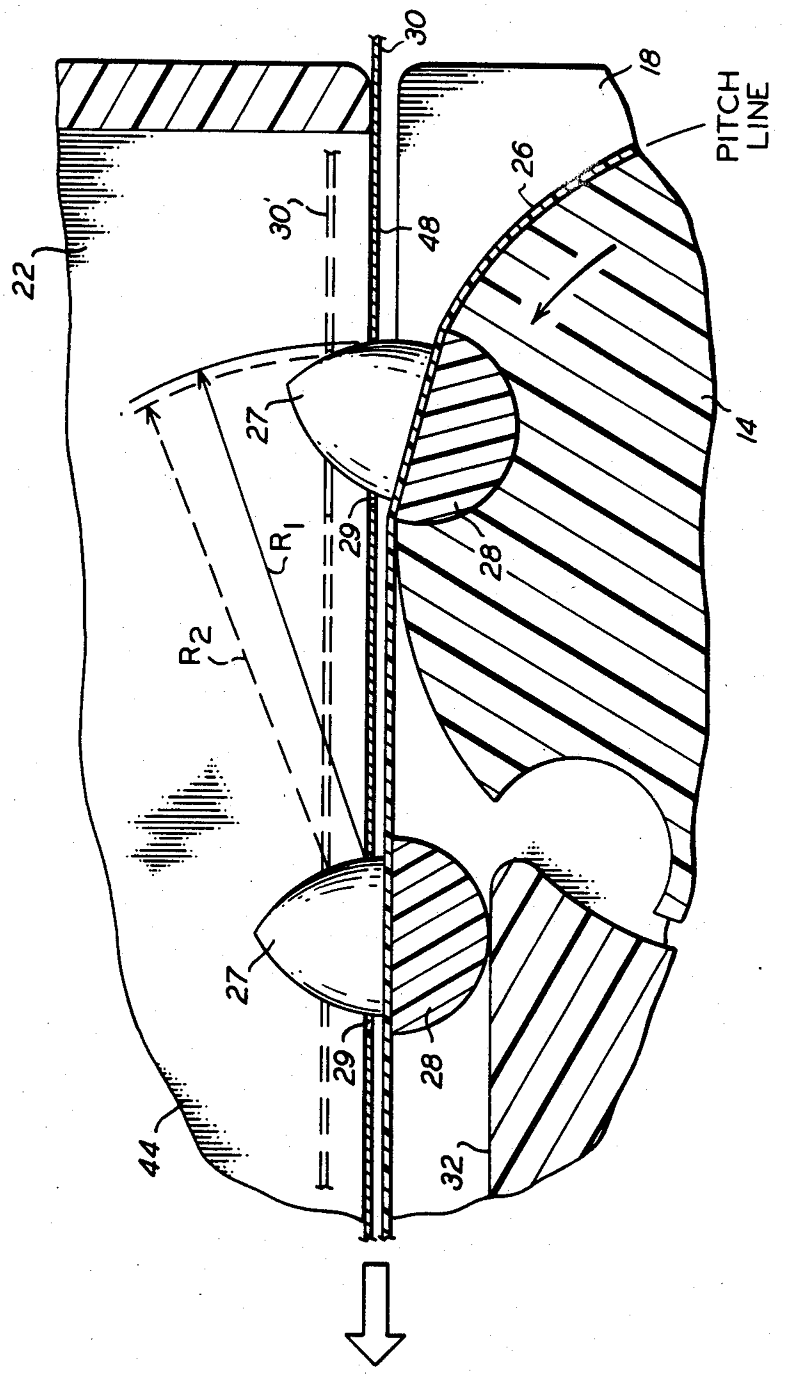
FIG. 4 is a diagrammatic, fragmentary sectional view taken along the line 4—4 in FIG. 2.

Referring more particulary to FIGS. 1, 2 and 3, there is shown a tractor 10 having a frame 12 in which are journaled two sprockets one of which 14 is illustrated in detail. The sprockets are journaled in the frame between the side plates 16 and 18 thereof. The sprocket 14 is driven by a drive shaft. The tractor is clamped on a support shaft by a floating collet clamp mechanism 20. A lid 22 is pivotally mounted on the frame by hinge assemblies 24. A belt 26 having pins 27 and lugs 28 (see FIG. 4) is entrained around the sprocket 14 and located so that its pitch line (the line along which the distance or pitch between the pins 27 is measured) is located along a linear path in the region where the pins enter and are engaged in the perforations 29 in the web 30 (FIG. 4). The pitch of the belt is equal to the pitch of the perforations so that the web (the edge perforated paper 30) is driven with and by the belt as the sprocket 14 is rotated by the drive shaft. The drive shaft may be connected through suitable gearing, belting or other transmission means to a stepper motor for feeding the paper 30 stepwise at high acceleration and with high speed.

The lid 22 may be flipped upwardly about the pins 25 of the hinge assembly 24 so as to enable the paper to be placed in the tractor with the pins 27 in the perforations 29. When the lid is flipped downwardly its downward position is set by a surface 34 in the side plate 16. This surface 34 and a corresponding surface (not shown) are adjacent to the hinge assemblies 24. The lid, when turned down toward the belt 26 is yieldably biased by a spring 36.

The pitch line of the belt is essentially at its feeding surface since the belt is very thin (say 5 mils). By convention the pitch line is in the center of the belt. The pitch line of the belt also corresponds to the pitch line of the sprocket 14. The linear path of the belt is defined by a support 32 in the frame. A portion of the path is curvilinear and extends around the sprocket. Both the lid 22 and the frame 12 extend beyond the sprockets and are spaced from each other by a lid gap (see FIG. 3). The lid gap is straight so that the paper 30 is maintained in a plane and tensioned between a pair of tractors 10 and 11 which drive the paper (see FIG. 5). So far described the tractor is of conventional design and generally of the type described in U.S. Pat. Nos. 3,825,162 and 4,129,239 issued to Leo James Hubbard. The earlier patent may be referred to for information concerning the design of the tractor generally and the later Hubbard patent may be referred to for information respecting the design of the floating collet clamp mechanism 20 used therein.

The lid 22 has a slot 38 through which the pins 27 may be viewed from the top of the tractor through the lid. The slot 38 continues as a blind slot outwardly toward the ends of the lid as shown at 40 in FIG. 3. The side of the lid defined by the inside wall 42 of the slot is formed with a rib 44. The lower surface of the rib 44 which faces the belt 26 defines the lid gap. This lower surface is shown at 48 in FIG. 4.

The surface 48 extends along a linear path opposite to the region of the belt where the pins 27 enter and engage the perforations 29. The use and location of the rib 44 is critical, as described above, to the precision feeding of the paper 30 through the tractor. The surface 48 is located so that the paper 30 is at or substantially at the pitch line of the belt. In a preferred embodiment, the spacing between the upper or paper guide surfaces 50 and 52 of the side frames 16 and 18 and the bottom surface 48 of the rib is less than 10 mils. This spacing is enlarged in FIG. 4 to facilitate the illustration. The spacing may be such that the paper 30 is on the surface of the belt 26. In the event that the paper is relatively thick (for example a multi-part computer form) or has crimps or tents (at cross perforations) the pressure on the lid 22 is relieved by reason of the yieldable connection of the lid to the frame provided by the spring 36.

The spacing of the paper 30 assures that the perforations will engage the pins below the position of repose. The position of repose is determined by considering the pin surface as an inclined plane. The pin surface is preferably an involute which is defined by a radius, R (see FIG. 4A), which is equal to the diameter of the pin and in cross section has its center at the base of the pin where it contacts the flat, flexible portion of the belt 26. This portion is preferably made of polyamide such as Kapton (a trademark of the E. I. DuPont Company) but may be some other flexible material of suitable flexibility and tensile strength.

The pin surface in cross section is essentially an involute in shape. It is almost a perfect involute to approximately 60% of the height of the tooth and then is slightly less steep than a perfect involute shape. As noted above such a substantially involute shape enables the pins to enter and leave the perforations in the paper 30 without significant ticking which may deform or tear the paper at the perforations. The effective force, $F_{eff.}$ (the reaction force of the paper against the pin which is perpendicular to the wall of the pin), will tend to hold and maintain the paper against the pin depending upon the coefficient of friction between the materials constituting the paper and the pin. The angle of repose, $\alpha$, defined by that position of repose may be determined by inclined plane principles to be equal to the tangent of the angle $\alpha$ which is between the diameter and the surface of the belt as taken in cross section through the axis 50 of the pin.

Consider that when the belt 26 stops, the inertia of the paper will carry the belt until the perforations 29 engage the pins at the rear of the pins, as shown in FIG. 4. If the paper is maintained below the position of repose, it will slide down to the base of the pin. With the lid gap set so that the paper 30 is at or substantially at the pitch line contact will be made below the position of repose. On the other hand, with conventional lid gaps the paper will be positioned above the position of repose. FIG. 4 shows two interference curves, one generated by the radius $R_1$ where the lid gap is such that the paper is substantially at the pitch line. Radius $R_2$ defines another interference curve shown in dash lines for the case where the paper is well above the pitch line for example with a conventional 35 to 40 mil lid gap. The interference curve generated by $R_1$, even where the pin is entering the paper, is below the position of repose. For the higher lid gap the paper shown in the dash lines at 30′ will not slip on the surface of the pins but will be carried with the pins as the pins rise and are forced against the underside of the lid. At a minimum this introduces excessive drag and demands more torque from the tractor drive motor. It also holds the paper back so that, on restarting, the pin picks up sufficient velocity to impact the perforations with excessive force and may tear the perforations. There is also introduced a delay before feeding starts which may be variable depending upon where the paper stopped during the last step. Feeding is therefore irregular and inaccurate. A worse case condition will cause a jam because the paper will be jammed between the lid and the pin.

Figure 4A:
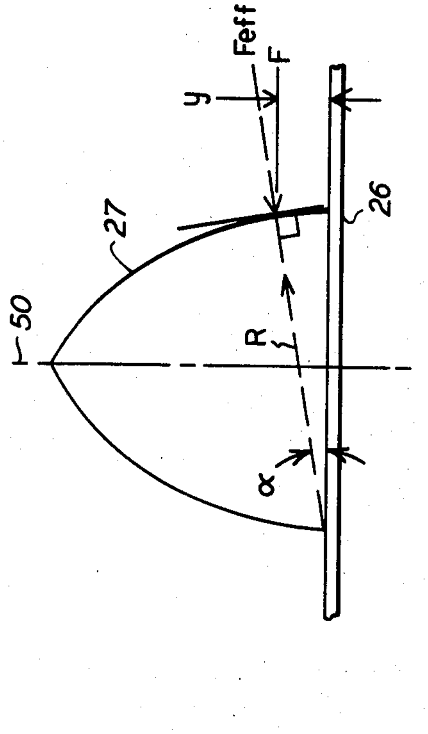
FIG. 4A is a diagrammatic view of a pin on the tractor belt showing the derivation of the angle of repose, $\alpha$, and the critical position of repose.

The critical position of repose may be determined by the product of the sine of the angle of repose ($\alpha$) and the diameter of the pin R as will be apparent from FIG. 4A. Accordingly, based upon the criteria provided in accordance with the invention, a tractor may be designed so as to provide for accurate, precision feeding even at high speeds and accelerations.

Figure 5:
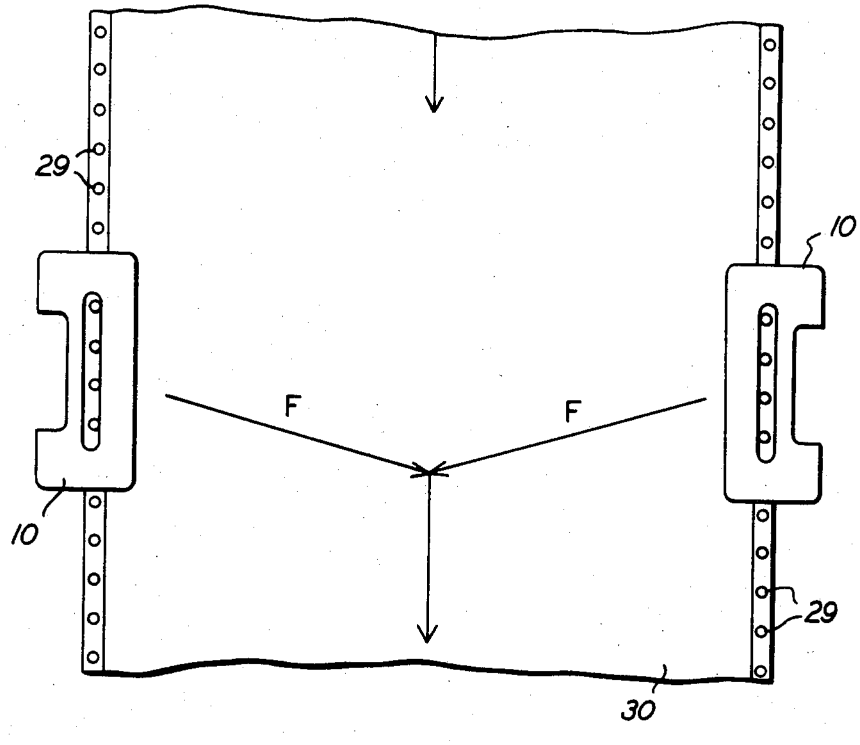
FIG. 5 is a diagrammatic view illustrating the thrust toward the center of the paper during feeding by tractors engaged with perforations engaged along opposite edges of the web.

As shown in FIG. 5, by the arrows, the driving forces F on the paper 30 produce components which tension the paper toward the center thereof. At high driving speeds and accelerations, these forces produce couples on the pins and tend to twist the belt. These forces are opposed by the thrust surface 42 provided by the inside wall of the lid slot 38. This wall is placed so that it is in contact with the surface of the pins along diameters through the pins which are perpendicular to the feeding direction of the paper and also perpendicular to the belt edges.

Figure 8:
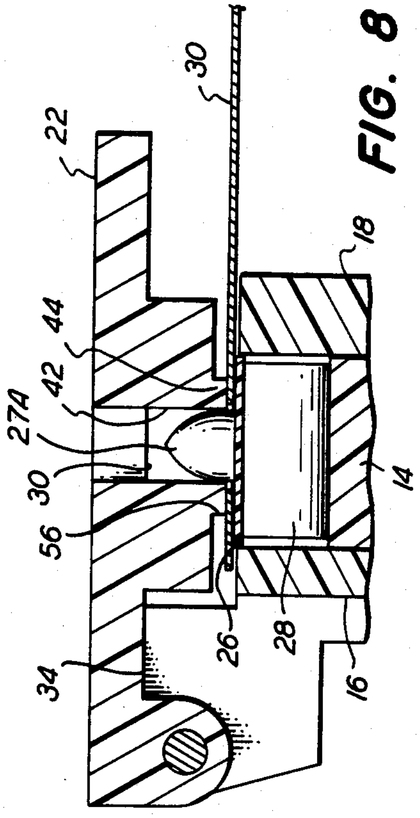
FIG. 8 is a fragmentary sectional view similar to FIGS. 3 and 6 wherein the lid is configured in accordance with still another embodiment of the invention.

While a single thrust surface wall 42 may be used, it may be desirable to extend the inside surface 54 of the slot 38 downwardly to define another rib 56 in addition to the rib 44 (see FIG. 8) then the pins are completely restrained against twisting.

Figure 7A:
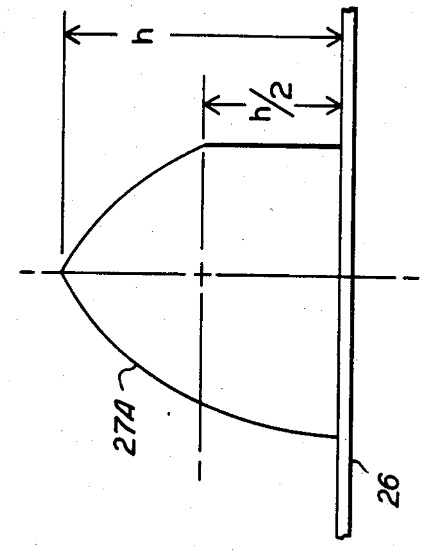
FIG. 7A is an end view of the pin shown in FIG. 7.
Figure 7:
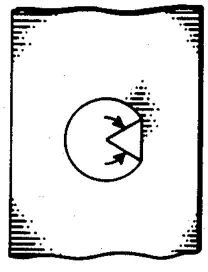
FIG. 7 is a fragmentary plan view of the belt used in the tractor shown in FIG. 6 which shows the flattened pin.
Figure 6:
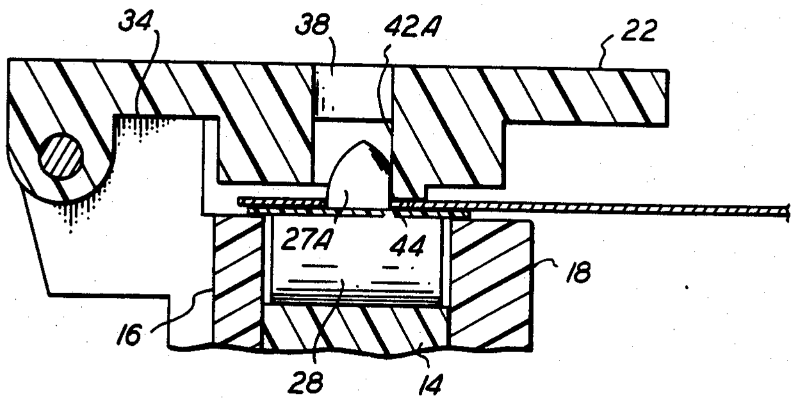
FIG. 6 is an enlarged sectional view similar to FIG. 3, but with the pins flattened on the side so as to bear against a thrust surface on the lid.

In order to provide a firm surface against which the pins may bear, the surface 42 may be extended outwardly as shown at 42A in FIG. 6. The pin 27A is truncated along the side thereof which engages the thrust surface provided by the wall 42A to approximately half the height of the pin (h/2) as shown in FIG. 7A. Then a segment of approximately 60° to 90°, illustrated by the angle $\beta$ in FIG. 7, is truncated from the pin shape. Since this angle is centered along a diameter perpendicular to the edge of the belt 26 and extends only 60° to 90°, less than 10% of the driving surface of the pin is affected.

From the foregoing description it will be apparent that there has been provided improved tractor apparatus. Variations and modifications in the herein described apparatus, within the scope of the invention, will undoubtedly suggest themselves to those skilled in the art. Accordingly, the foregoing description should be taken as illustrative and not in a limiting sense.

We claim:

1. A tractor for feeding a perforated web which comprises a web drive member having a pitch line, said web drive member having pins extending above said pitch line and spaced from each other a distance equal to the pitch of the perforations in said web so as to enter and engage said web in said perforations, a frame in which said member is movably mounted with said pitch line along a given path in a region of said member where said pins enter and are engaged in said perforations, and a lid movable toward and away from said frame and having a surface disposed opposite to said region of said member when moved toward said frame which is then spaced sufficiently close to said pitch line to locate said web substantially at said pitch line.

2. The tractor according to claim 1 further including means yieldably biasing said lid toward said member when said lid is moved toward said frame.

3. The tractor according to claim 2 wherein said lid is pivotally mounted on said frame.

4. The tractor according to claim 1 wherein said lid has a slot into which said pins extend in said region.

5. The tractor according to claim 4 wherein said slot has walls against at least one of which said pins bear in said region.

6. The tractor according to claim 5 wherein the area of the surface of said pins which bear against said one wall of said slot are flattened.

7. The tractor according to claim 6 wherein said area has a height equal to about one half of the height of said pins above said pitch line.

8. The tractor according to claim 6 wherein said area circumscribes a sector of said pin from 60° to 90° with the center of said sector being along the radius of said pin perpendicular to said one wall.

9. The tractor according to claim 1 wherein the space between said lid surface and said pitch line is such that said web is retained below the position of repose of said web on any of said pins in said region.

10. The tractor according to claim 1 wherein said spacing between said pitch line and said lid is substantially equal to or less than the product of the diameter of the pin and the sine of the arc tangent of the coefficient of friction between said web and said pin materials.

11. The tractor according to claim 1 wherein said drive member is a flexible, endless belt at least one sprocket rotatably mounted on said frame in driving engagement with said belt, and said path including a curvilinear portion where said belt in entrained around said sprocket and a linear portion where said belt is supported by said frame, said curvilinear and linear portions being spaced from each other to define a curve along which said pins move in said curvilinear region where there can be interference between said pins and said web perforations, said lid surface spacing one side of said web and said frame having a surface opposite to said lid surface facing the opposite side of said web, said spacing between said pitch line and lid surface in the curvilinear as well as the linear portion of said given path in said region being sufficiently close to said belt to limit the intersection between said interference curve and said web below the position of repose of said web on any of said pins.

12. The tractor according to claim 11 wherein said spacing between said belt and said lid surface in both said linear and curvilinear portions of said region is substantially equal to or less than the product of the diameter of the pins and the sine of the arc tangent of the coefficient of friction between said web and pin materials.

13. The tractor according to claim 12 wherein the surface of said pins is substantially of involute shape.

14. The tractor according to claim 12 wherein said lid surface and frame surfaces which are opposite to each other are substantially coplanar and define a linear path for said web therebetween in said tractor.

15. The tractor according to claim 11 wherein said surface on said lid is defined by at least one rib which extends over said region between one of the edges of said belt and said pins.

16. The tractor according to claim 15 wherein said web has a row of said perforations adjacent to one edge and another row of perforations along and adjacent to the opposite edge of said web, each row of perforations being engaged by the pins of the belt of a separate tractor, said one edge of said belt being the inside belt edge furthest from the edge of said web.

17. The tractor according to claim 16 wherein said rib defines a wall adjacent to said pins which is perpendicular to said belt and provides a thrust surface against which said pins bear.

18. The tractor according to claim 17 wherein said pins have segments thereof which bear against said thrust surface flat and perpendicular to said belt.

19. The tractor according to claim 18 wherein said flat pin surfaces have a height about one half the height of said pins.

20. The tractor according to claim 18 wherein said segments are from 60° to 90° and centered along the radius thereof perpendicular to the edge of said belt.

21. The tractor according to claim 11 wherein said lid has a pair of said ribs parallel to each other and having walls which bear against said pins at diametrically opposite areas of said pins.

22. In a perforated paper feed tractor having a belt with pins which enter the perforations in said paper and having at least one sprocket, a frame having means supporting said belt with its pitch line along a linear path and entrained in driving relationship with said sprocket, the improvement comprising a lid on said frame defining a linear path for said paper through said tractor essentially coplanar with said linear path of said pitch line, said lid having a rib with a surface opposing said belt and spaced from said belt by a distance approximately the thickness of said paper or less.

23. The invention as set forth in claim 22 wherein said pins surfaces are substantially of involute shape from said belt to the apex of said pins.

24. The invention as set forth in claim 22 wherein said rib has a wall defining a thrust surface perpendicular to said belt and to diameters of said pins which are perpendicular to the edge of said belt, said thrust surface being disposed in contact with areas of said pins facing toward the center of said paper.

25. The invention according to claim 24 wherein the areas of said pins which contact said thrust surface are flat in segments of from about 60° to 90° centered about said pin diameters which are perpendicular to said belt edge.

* * * * *